A. SORENSEN.
HANDLE.
APPLICATION FILED MAY 21, 1917.

1,249,536.

Patented Dec. 11, 1917.

Witness
G. T. Baker

Inventor
Albert Sorensen
By
Attorney

UNITED STATES PATENT OFFICE.

ALBERT SORENSEN, OF WASHINGTON, DISTRICT OF COLUMBIA.

HANDLE.

1,249,536.

Specification of Letters Patent. Patented Dec. 11, 1917.

Application filed May 21, 1917. Serial No. 170,112.

*To all whom it may concern:*

Be it known that I, ALBERT SORENSEN, a subject of the King of Denmark, and resident of Washington, District of Columbia, have invented certain new and useful Improvements in Handles, of which the following is a specification.

This invention relates to handles and more especially to handles for wire reels for the military service and analogous applications.

It is the object of the invention to provide an improved handle that will be strong and durable and comparatively inexpensive to manufacture, and also be fully adapted for the service to which it would be subjected in practical use.

Other objects and the features of novelty will be apparent from the following description taken in connection with the accompanying drawings, in which.

Figure 1:
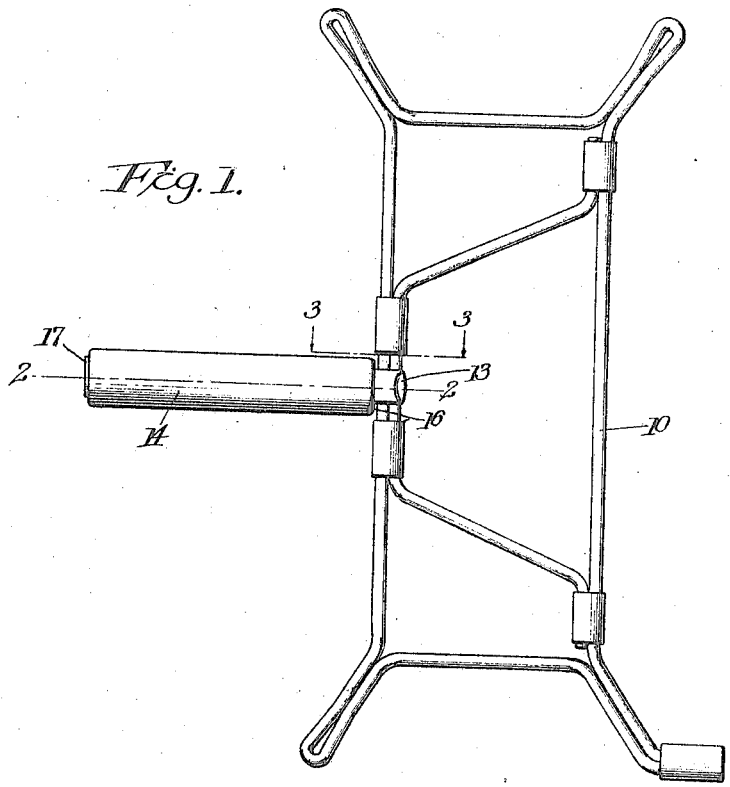
Figure 1 is an elevation of a wire reel embodying the invention.

Referring to the drawings, 10 indicates the frame of a reel which is commonly used in the signal service of the United States military forces. The frame 10 is formed of wire bent to the desired shape and suitably reinforced. From one side of the frame 10 there projects a handle portion 11 formed by twisting together the ends of the wire of which the frame 10 is made. Arranged on the handle portion 11 is a tube 12, preferably of brass or other substantially non-rusting material, this tube tightly fitting the handle portion 11 and having a bifurcated end 13 that receives and is formed over and brazed, welded, soldered or otherwise rigidly secured to a part of the frame 10.

Figure 2:
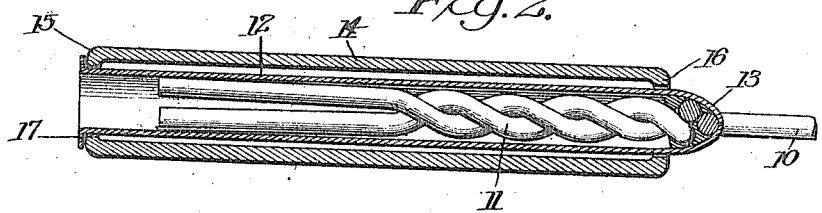
Fig. 2 is an enlarged section on line 2—2 of Fig. 1.
Figure 3:
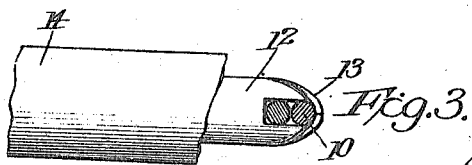
Fig. 3 is a fragmentary section on line 3—3 of Fig. 1.

Surrounding the tube 12 is a rotatable tubular handle 14 which may be made of common gas pipe. The ends of the handle 14 are reduced, as indicated at 15 and 16, and bored out to loosely contact with the tube 12, this construction insuring that the handle 14 will have bearing only at its ends on tube 12, and as tube 12 will be of non-rusting material, there will not be much liability for the handle 14 to rust fast to the tube. The ends of the handle portion 11 of the frame are preferably shorter than the tube 12, as shown in Fig. 2, and the outer end of the latter is expanded over the end of the handle 14, as indicated at 17, to hold the handle on the tube.

The construction just described is very substantial because of the reinforcement given by the tube 12 and the soldered connection directly with the frame 10. The provision of the flange 17 is a very inexpensive and satisfactory method of securing the handle 14, and insures against its accidental removal.

I do not claim as my invention, the frame 10, my improvements being confined to the handle structure and the method of securing same to the frame, and while I have described and claimed herein what I now consider to be the preferred form of my invention, I realize that this form is susceptible of variation as to many of the details and I therefore do not wish to be limited to the exact details shown and described, it being my intention to claim such modifications as are included within the terms of the appended claims.

Having described the invention what is claimed is:—

1. In a device of the class described, a frame having a twisted wire handle, a tube on said handle and secured at one end to said frame, a tubular handle rotatably arranged on said tube, and the end of said tube being enlarged to secure said tubular handle thereon.

2. In a device of the class described, a frame having a twisted wire handle, a tube surrounding said handle and having a bifurcated end receiving and rigidly secured to a part of said frame, a tubular handle rotatably arranged on said tube, and the end of said tube being enlarged to secure said tubular handle thereon.

3. In a device of the class described, a frame having a twisted wire handle, a tube of substantially non-rusting material inclosing said handle and having a bifurcated end receiving and rigidly secured to a part of said frame, a rotatable tubular handle surrounding and having its ends only in contact with said tube, and means at the outer end of said tube for securing said tubular handle thereon.

4. In a device of the class described, a frame having a twisted wire handle, a tube surrounding said handle and secured at one end to said frame, a metallic tubular handle having reduced ends in loose bearing contact on said tube, and means at the end of said tube for securing said tubular handle thereon.

5. In a device of the class described, a frame having projecting therefrom a wire handle portion, a substantially non-rusting metallic tube on said handle portion and having a bifurcated end receiving and soldered to a part of said frame, a tubular handle rotatable on and having its ends only in contact with said tube, and said tube being enlarged at its outer end to hold said tubular handle thereon.

6. In a device of the class described, a frame having projecting therefrom a twisted wire handle portion, a metallic tube on said handle portion and having a bifurcated end receiving and soldered to a part of said frame, a tubular handle rotatable on and having its ends only in contact with said tube, and one of said tubular parts being of substantially non-rusting material and the inner one having its outer end expanded to hold the outer one thereon.

7. In a device of the class described, a frame, a handle member having a bifurcated end receiving and rigidly secured to a part of said frame, a rotatable handle member on the first mentioned member, and means on the outer end of the first mentioned member for securing said rotatable member thereon.

8. In a device of the class described, a wire frame having a handle projecting from one side and in the plane thereof, said frame being formed with a plurality of wires arranged side by side at the point of attachment of said handle, and said handle comprising an inner cylindrical member having a bifurcated end receiving and rigidly secured to said plurality of wires, an outer member rotatable on said inner member, and means on the outer end of said inner member for securing said outer member thereon.

In testimony whereof I affix my signature.

ALBERT SORENSEN.

Copies of this patent may be obtained for five cents each, by addressing the "Commissioner of Patents, Washington, D. C."